(No Model.) 2 Sheets—Sheet 2.

M. N. FORNEY.
LOCOMOTIVE AXLE BOX.

No. 527,960. Patented Oct. 23, 1894.

WITNESSES:
T. J. Hogan.
F. E. Gaither.

INVENTOR
M. N. Forney.
BY
J. Snowden Bell
ATTORNEY

United States Patent Office.

MATTHIAS N. FORNEY, OF NEW YORK, N. Y.

LOCOMOTIVE-AXLE BOX.

SPECIFICATION forming part of Letters Patent No. 527,960, dated October 23, 1894.

Application filed February 13, 1894. Serial No. 500,064. (No model.)

*To all whom it may concern:*

Be it known that I, MATTHIAS N. FORNEY, of the city, county, and State of New York, have invented a certain new and useful Improvement in Locomotive-Axle Boxes, of which improvement the following is a specification.

My invention is more particularly designed for, although not limited to, application in locomotives having four or more of their wheels coupled by cranks and connecting rods, and its object is to maintain a uniform distance between the centers of the coupled axles of locomotives, which distance shall be exactly the same as that between the centers of the journals or crank pins of the connecting rods.

To this end, my invention, generally stated, consists in the combination of an axle box fitted upon an axle and adapted to oscillate about the center thereof, an axle box fitted upon a second axle which is connected by cranks and coupling rods to the first axle, said second axle box being adapted to oscillate about the center of the first axle, and a rigid connection uniting said boxes one to the other.

The improvement claimed is hereinafter fully set forth.

Figure 1:
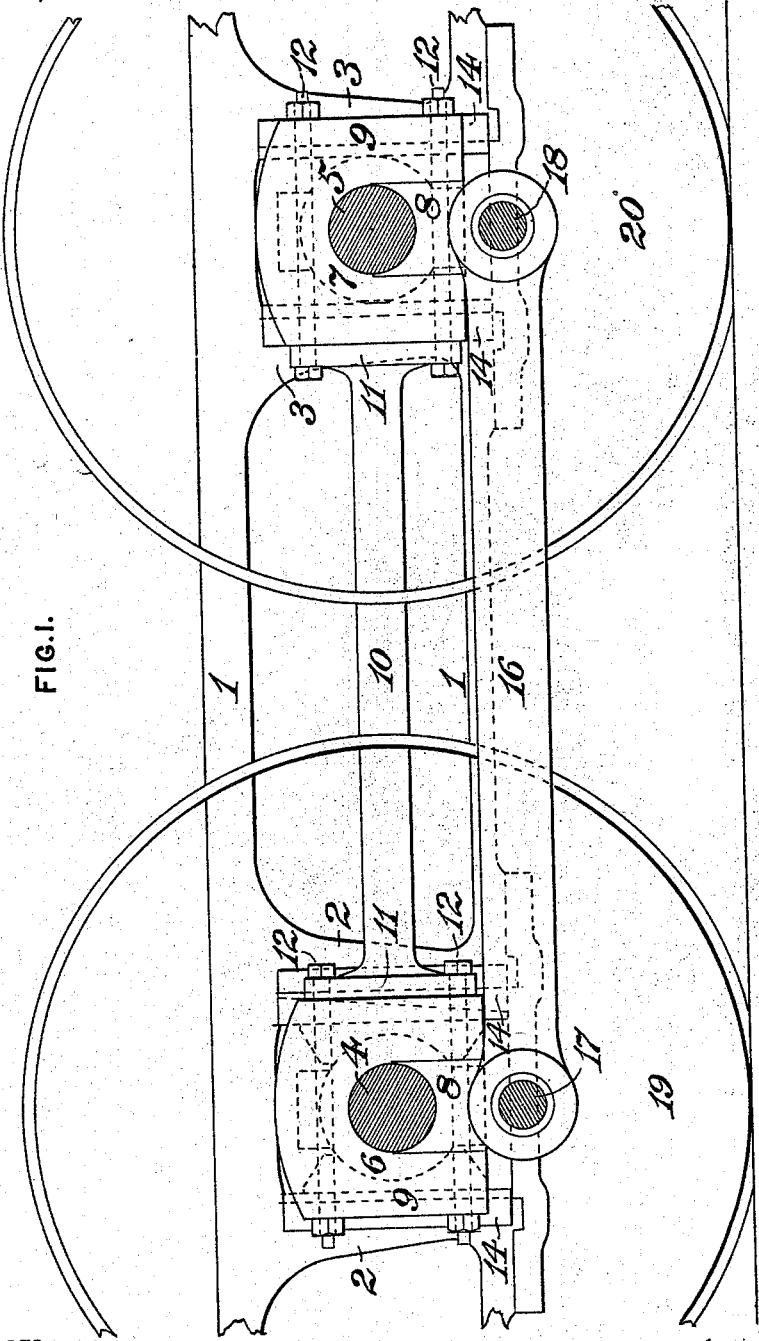
Figures 2, 3:
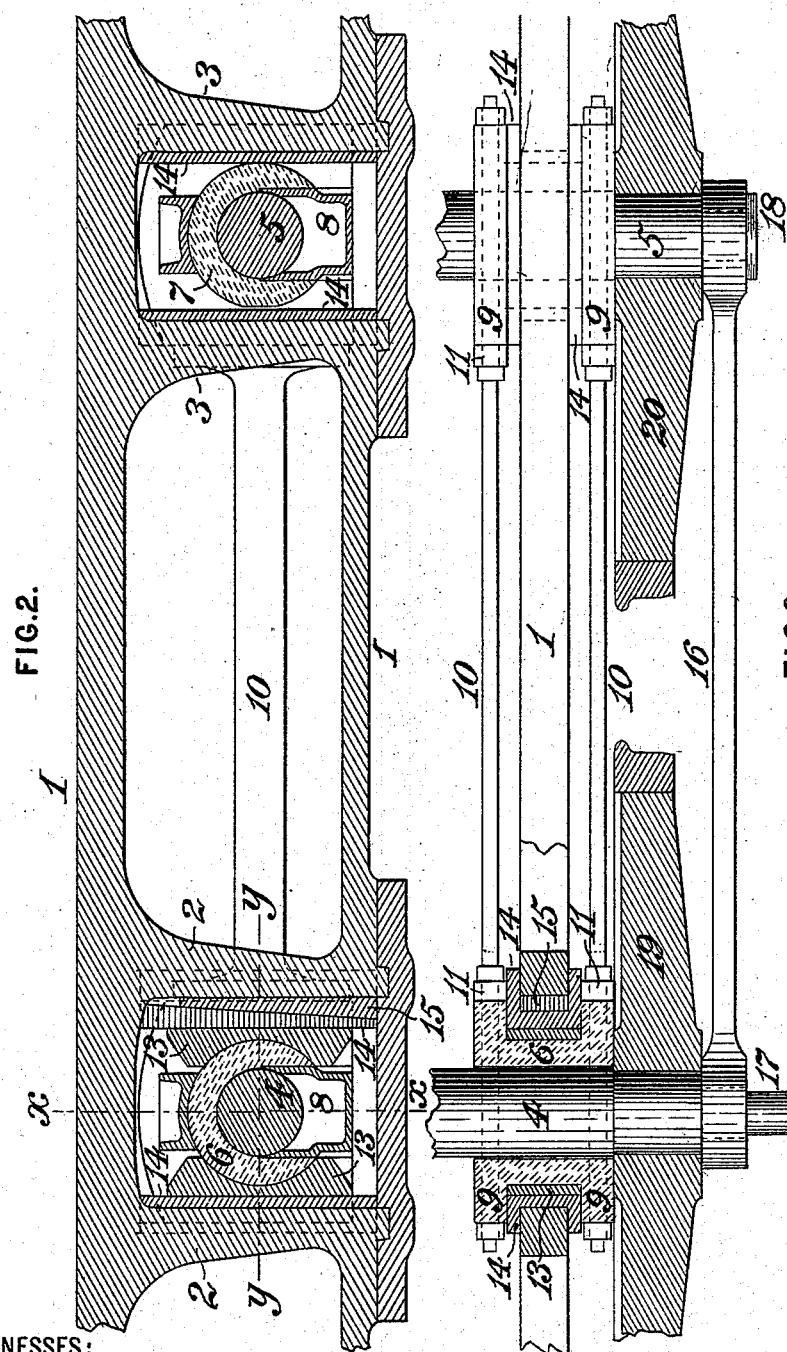

In the accompanying drawings: Figure 1 is a side view, in elevation, of a portion of a locomotive engine frame, with two driving axle boxes and their rigid connection, and two driving wheels, with their crank pins and coupling rod, illustrating an embodiment of my invention, only the peripheries of the driving wheels being shown, to prevent obscuring the parts behind them; Fig. 2, a vertical central section, and Fig. 3, a plan or top view of the same, the driving wheels and main axle box being shown in section at the line $y, y$, of Fig. 2.

Locomotive axle boxes have been usually heretofore so fitted in the frames that contiguous boxes are each movable vertically in the jaws of the frame, independently one of the other. When both driving axle boxes, on one side of the engine, occupy the same vertical position in their respective jaws, then the distance apart of the centers of the axles is measured by, and is equal to, the horizontal distance apart of the centers of the jaws, but if one box moves up higher in its jaws than the other, then the distance apart of the centers of the boxes and the axles is measured by the hypotenuse of a right angled triangle, whose base is the horizontal distance between the centers of the jaws and whose perpendicular is equal to the difference in the vertical position of the boxes in the jaws. Consequently if one box moves up, or the other moves down, or both, the distance between the centers of the axle is slightly increased, and this increase, which is sufficient to throw great strains on the coupling-rods, crank-pins, journaled bearings and frames, is a prolific cause of the breaking of these parts, as well as of increased friction on crank-pins and axle journals.

My invention is designed to substantially eliminate the strains due to the cause above recited, and thus to prevent the frequent breakage of the parts named and lessen the friction on the journals.

Under my invention the main driving axle boxes, and the parts intervening between them and the frames, are so fitted that the boxes are allowed free vertical movement in the jaws of the frames, as is almost universally the case with all driving axle-boxes of locomotives, as heretofore constructed. At the same time the main driving axle-boxes, and the parts between them and the jaws of the frame, are so formed and fitted as to permit the boxes to oscillate several degrees about the center of the main axle. The boxes on the axles, the wheels of which are coupled to the main driving wheels have the usual vertical movement, and also have a light amount of longitudinal play in the jaws, so as to be capable of moving in the arc of a circle about the centers of the adjoining boxes to which they are connected. The two driving-axle boxes on each side of the locomotive, are rigidly connected together, the connecting elements being securely bolted to the boxes, and thereby holding the latter at the same distance apart at all times. This construction allows both boxes on each side of the engine to move freely in a vertical direction in the jaws of the frame, and at the same time permits them both to oscillate about the center of the main driving axle. They can thus move vertically simultaneously, in the same or in opposite directions, or one can move independently of the other, and in doing so they will always maintain the same relation to each other, and their centers will always be exactly the same distance apart. The construction of the parts of a locomotive shown in the drawings, which is designed to accomplish these ends by means adapted for practical application, will now be described.

The locomotive frame 1, in the instance herein illustrated is of the type which has become standard in American practice, the frame on each side having a pedestal or jaws 2 for a main driving axle box, and a pedestal or jaws 3 for the box of an axle 5, which is coupled, in the usual manner, to the main driving axle 4, by connecting-rods 16 and crank-pins, 17, 18. The main axle 4 rotates in a journal-box or bearing 6, the middle or main portion of which is made cylindrical in form, with an opening in its under side to receive the oil cellar 8, and to enable the box to be taken off and put on the axle when the oil cellar is removed. The axle-box 7 of the coupled axle 5, is shown as of substantially similar form to the main driving axle box, and is provided with a similar oil cellar 8, but such form is not essential, the only requirement being that the side of the box 7, farthest from the box 6, and the opposite side of the box 7 shall be of such a form as to admit of a small amount of horizontal movement between the faces of the adjacent shoes.

The boxes 6 and 7 are provided, at and adjacent to their inner and outer ends, that is to say, those that are on opposite sides of the frame, with heavy flanges 9, which are, approximately, of square or rectangular form, as shown in Fig. 1, their purpose being the same as that of the similar flanges of ordinary locomotive axle boxes, that is to say, to hold the boxes in position laterally, while admitting of their free vertical movement in the jaws. The flanges 9 further serve for the attachment of the rigid connection 10 by which the main driving axle box 6, on each side of the engine, is secured to the axle-box 7, of the coupled axle 5, on the same side. The rigid connection 10, on each side, is formed of two stout bars, located on the inner and outer sides of the frame, and having T heads or lugs 11 on their ends, which are secured by bolts 12 to the flanges 9 of the boxes 6 and 7. These boxes are thus held rigidly together and always maintained at the same distance apart.

It will be obvious that if the box 7 should move up or down in its jaws, independently of the box 6, the two being thus rigidly connected together, the movement of the box 7 would produce a twisting motion of the box 6 about its axis. To admit of such motion, the body or central portion of the box 6, between its flanges 9, 9, is turned exteriorly to true cylindrical form, and is held between two bearings 13, 13, which are bored out to fit or conform to the cylindrical surface of the box 6, which is concentric with the axle 4. These bearings are fitted to slide vertically in the jaws 2, in contact with the faces or shoes or liners 14, 14, therein, which faces, as well as the outer faces of the bearings 13, are made truly vertical and parallel.

Under a construction substantially as above described, if the box 7 should move up or down in the jaws 3, while the center of the axle 4 remains in one vertical position, the box 6 is free to twist or oscillate about its center, by turning in the curved faced bearings 13, or the box 6 may move up or down independently of the box 7, or both may move together, either in the same or in opposite direction. The center of the axle 4, and its box 6, can move only in a straight vertical line, and the box 6 is thus securely held, so that the center of the axle 4 will always be in the vertical center line $x$, $x$, of the jaw 2. The box 7 being secured to the box 6, by the rigid connection 10, it will always be held at exactly the same distance from the box 6, regardless of what vertical position either of said boxes may assume. The box 6 being held in its longitudinal position by the bearings 13, shoes 14, and jaw 2, and the box 7 being rigidly connected to the box 6, the box 7 is securely held in its longitudinal position by the rigid connection 10, and therefore it is not necessary to confine its movement in this direction by the jaw 3 and the shoes or liners 14 thereof, and it is allowed to have some longitudinal play. This is necessary for the reason that being connected to the box 6, the box 7, when moving vertically, independently of 6, must traverse in an arc of a circle, the center of which is the center of the axle 4. The box 7 is therefore not fitted so as to have a bearing against the faces of both of the shoes 14 of the jaw 3, but a small amount of clearance is allowed, on the side nearest the box 6, so as to admit of the movement of the box 7, in an arc of a circle, about the center of the axle 4. The box 7 is held in position transversely by its flanges 9, similarly to the box 6.

One of the shoes 14, of the main driving box 6, is made of the usual wedge shape, and a wedge 15 is inserted between it and the adjacent face of the jaw, said wedge being adapted to be forced upward by a screw, which is not shown, in the usual manner. By this means, wear of the bearings 13 and shoes 14 can be taken up, as required, by forcing up the wedge 15. No wedge is required in connection with the box 7, for the reason that it is held longitudinally by the rigid connection 10.

While I have described the main driving axle-box 6, as having a "cylindrical" body, for the reason that its middle portion is turned exteriorly to cylindrical form, this being the simplest and most accurate manner of forming the required outer bearing surfaces upon it, it will be seen by reference to Fig. 2, that, when finished, its cylindrical contour is interrupted, at bottom, by the oil cellar 8, and, at top, by the ordinary spring pocket. It is, therefore, only necessary that bearing faces, which are portions of the surface of a cylinder, concentric with the axle, shall be formed upon the front and rear sides of the box, and that they shall extend for a sufficient distance above and below the corresponding faces of the bearings 13, to admit of such degree of oscillatory movement of the box 6, upon the axle 4, as will accord with the range of vertical traverse which the box 7 is allowed.

I claim as my invention and desire to secure by Letters Patent—

1. The combination, substantially as set forth, of two axles or shafts, coupling rods and cranks connecting said axles, an axle box fitted upon one of said axles and adapted to oscillate about the center thereof, an axle box fitted upon the other axle and adapted to oscillate about the center of the first axle, and a rigid connection securing said axle boxes one to the other.

2. The combination, substantially as set forth, of two axles or shafts, coupling rods and cranks connecting said axles, a frame, bearings fitted to slide vertically in a pedestal or jaws thereon, an axle box fitted upon one of said axles and fitted concentrically in said bearings, an axle box fitted upon the other axle and adapted to oscillate about the center of the first axle, and a rigid connection securing said axle boxes one to the other.

3. The combination, substantially as set forth, of two axles or shafts, coupling rods and cranks connecting said axles, a frame, bearings fitted to slide vertically in a pedestal or jaws thereon, an axle box fitted upon one of said axles and fitted concentrically in said bearings, an axle box fitted upon the other axle and fitted, with the capacity of both vertical and longitudinal movement, in a pedestal or jaws on the frame and a rigid connection securing said axle boxes one to the other.

4. The combination, substantially as set forth, of two axles or shafts, coupling rods and cranks connecting said axles, a frame, bearings fitted to slide vertically in a pedestal or jaws thereon and having inner bearing faces concentric with one of said axles which is adapted to rotate in said pedestal or jaws, an axle box fitted on said axle and having outer bearing faces concentric therewith and abutting against those of the bearings, an axle box fitted upon the other axle, and a rigid connection securing said boxes one to the other.

5. The combination, substantially as set forth, of a frame, bearings fitted to slide vertically in a pedestal or jaws thereon, an axle box fitted upon an axle and fitted concentrically in said bearings, end flanges projecting from said axle box on opposite sides of the frame, an axle box fitted upon a second axle and adapted to oscillate about the center of the first axle, end flanges projecting from said second-named axle box on opposite sides of the frame, and two connecting bars attached at their opposite ends to the two axle-boxes respectively.

MATTHIAS N. FORNEY.

Witnesses:
FRANK J. FRENCH,
LENA F. VANNER.